United States Patent
Hosseini (10) Patent No.: US 11,740,490 B2
(45) Date of Patent: Aug. 29, 2023

(54) OPTICAL APPARATUS

(71) Applicant: E INK CORPORATION, Billerica, MA (US)

(72) Inventor: Peiman L. Hosseini, Bicester (GB)

(73) Assignee: E Ink Corporation, Billerica, MA (US)

( * ) Notice: Subject to any disclaimer, the term of this patent is extended or adjusted under 35 U.S.C. 154(b) by 307 days.

(21) Appl. No.: 16/500,887

(22) PCT Filed: Mar. 23, 2018

(86) PCT No.: PCT/GB2018/050768
§ 371 (c)(1),
(2) Date: Oct. 4, 2019

(87) PCT Pub. No.: WO2018/185461
PCT Pub. Date: Oct. 11, 2018

(65) Prior Publication Data
US 2020/0124881 A1     Apr. 23, 2020

(30) Foreign Application Priority Data
Apr. 6, 2017   (GB) ..................... 1705574

(51) Int. Cl.
*G02F 1/01*      (2006.01)
*B60R 1/08*      (2006.01)
(Continued)

(52) U.S. Cl.
CPC ............ *G02F 1/0147* (2013.01); *B60R 1/088* (2013.01); *E06B 9/24* (2013.01); *G02F 1/19* (2013.01); *E06B 2009/2464* (2013.01)

(58) Field of Classification Search
CPC ............... H01L 27/249; H01L 27/2481; H01L 27/2472; H01L 45/14; H01L 45/12;
(Continued)

(56) References Cited

U.S. PATENT DOCUMENTS

2007/0179239 A1\* 8/2007 Li ............................ G02B 5/22
250/226
2008/0296552 A1\* 12/2008 Hsu .................... H10N 70/8413
257/E47.001
(Continued)

FOREIGN PATENT DOCUMENTS

DE         3727320 A1    3/1989
DE       19604038 A1    8/1997
(Continued)

OTHER PUBLICATIONS

Heinilehto, et al. IR-wavelength Optical Shutter Based on IT/VO2/ITO Thin Film Stack, Journal of Electroceramics, 2011, 27:7-12.
(Continued)

*Primary Examiner* — Christopher Stanford
*Assistant Examiner* — Journey F Sumlar
(74) *Attorney, Agent, or Firm* — Rajesh Vallabh (57) ABSTRACT

Optical apparatus are disclosed, for use for example in glazing units for building or vehicles, in mirrors, or in low information displays such as signage or watches. In one arrangement, an optical apparatus comprises a plurality of optically switchable elements. Each optically switchable element comprises a portion of phase change material defining a pixel of the apparatus. Each pixel of phase change material is thermally switchable between a plurality of stable states having different refractive indices relative to each other. A plurality of switching elements are provided. Each switching element selectively causes heating in a corresponding one of the pixels of phase change material to perform thermal switching of the pixel of phase change material. Each pixel of phase change material has a length to width aspect ratio of at least 20:1.

19 Claims, 7 Drawing Sheets

(51) Int. Cl.
*E06B 9/24* (2006.01)
*G02F 1/19* (2019.01)

(58) Field of Classification Search
CPC ......... H01L 45/06; H01L 45/08; H01L 45/04; H01L 45/10; H01L 45/1666; H01L 27/2463; H01L 45/16; H01L 45/1608; H01L 45/1641
See application file for complete search history.

(56) References Cited

U.S. PATENT DOCUMENTS

| | | | |
|---|---|---|---|
| 2009/0251845 A1* | 10/2009 | Kiehlbauch | H01G 4/08 216/6 |
| 2010/0225989 A1 | 9/2010 | Anders | |
| 2011/0300684 A1* | 12/2011 | Choi | H10N 70/826 257/E21.004 |
| 2012/0009731 A1* | 1/2012 | Lee | H01L 45/1616 438/102 |
| 2013/0128333 A1 | 5/2013 | Agrawal et al. | |
| 2013/0143380 A1* | 6/2013 | Oh | H10N 70/066 438/381 |
| 2015/0098032 A1 | 4/2015 | Park | |
| 2015/0122474 A1 | 5/2015 | Petersen | |

FOREIGN PATENT DOCUMENTS

| | | |
|---|---|---|
| EP | 3203309 A1 | 8/2017 |
| JP | 2009086060 A | 4/2009 |
| WO | 9415785 A1 | 7/1994 |
| WO | 2015097468 A1 | 7/2015 |
| WO | 2015097469 A2 | 7/2015 |
| WO | 2016064186 A2 | 4/2016 |
| WO | 2017064509 A1 | 4/2017 |

OTHER PUBLICATIONS

Hosseini, et al., An Optoelectronic Framework Enabled by Low-Dimensional Phase-Change Films, Nature, 2014, 511:206-211.
PCT International Search Report and Written Opinion, PCT/GB2018/050768, dated Jun. 7, 2018, 11 pages.

* cited by examiner

OPTICAL APPARATUS

CROSS-REFERENCE TO RELATED APPLICATIONS

This application is a national stage entry of PCT International Application No. PCT/GB2018/050768, filed Mar. 23, 2018, which claims priority to Great Britain Application No. 1705574.0, filed Apr. 6, 2017, both of which are incorporated herein by reference as if set forth in their entirety for all purposes.

The present invention relates to optical apparatus, particularly optical apparatus having optically switchable elements. The invention is particularly applicable to implementing low information displays such as signage or watches, or in smart glazing or mirrors.

There is considerable interest in ways to improve the thermal insulation properties of glazing units (windows) during the daytime (especially during summer months) to control natural room heating as a result of solar radiation, and thus reduce cooling requirements necessary to maintain comfortable conditions for human occupancy. Use of window shades is one of the classic methods for controlling radiation, in combination with double glazed windows which rely on the presence of a thermally isolating space between the glass panes to reduce heat transfer between one side of the window and the other.

Other approaches have looked to converting windows from their current role as "energy users" (their presence causing increases in energy use for heating in winter and cooling in summer) to that of net energy suppliers. This goal can be achieved through dynamic glazings that can modulate solar heat gain. Incident solar energy depends on many factors such as the time of the day, season, climate, weather conditions, orientation of the window, and the like. To reduce overall energy consumption while also satisfying occupant needs requires dynamic response of the optical properties of the window to these variables. Dynamic glazing saves energy by directly reducing cooling loads, by offsetting electric lighting energy requirements through the effective use of glare-free daylight, and by allowing windows to act as passive solar collectors in winter, and to reject solar gain so as to prevent overheating in summer.

Automotive vehicles also have a need for windows with dynamic optical properties. Vehicles are typically equipped with multiple windows located around the passenger compartment of the vehicle. In addition to allowing the passengers to see from within the passenger compartment, the windows allow light and heat into the passenger compartment when the vehicle is in use and when the vehicle is parked. Over time the light and heat can cause wear to components and the passenger compartment as a whole can become uncomfortably warm for passengers due to the heat from the environment, especially in warm climates. Commonly, consumers use cardboard or reflective materials to block the windshield when the vehicle is not in use. However these materials may be bulky, difficult to use and have limited effectiveness. Alternatively when the vehicle is in use, automotive cooling/heating systems can be used to cool or heat the interior of the vehicle as required to control the internal temperature but this consumes fuel and increases the load on the vehicle battery. A form of dynamic vehicle glazing would allow a reduced load on the battery (thereby extending range) by blocking incoming infrared radiation and decreasing air conditioning load when it is hot outside and also reducing load on the car heater by letting in infrared radiation to heat the vehicle cabin when it is cold.

Mirrors are another form of glazing that is widely used for both domestic and commercial applications. In some cases it is desirable that the mirror has optical properties that can be dynamically changed. For example in an automotive application, rear view mirrors have a crucial safety role, but can generate unwanted reflections from headlights. In that case it is desirable to rapidly reduce the reflectivity of the mirror temporarily while the glare persists.

In applications such as low information displays more complex spatial changes may be desirable, but without cost of manufacture or power consumption becoming excessive. For example, it may be desirable to provide signage, for example large area signage, where a sign can be changed from one symbol or state to another. It may be desirable to provide a low information display for a watch that is capable of displaying different times, different time formats, or other information, without consuming too much power.

It is an object of the invention to provide an optical apparatus that at least partially addresses one or more of the desires mentioned above in relation to the prior art.

According to an object of the invention, there is provided an optical apparatus, comprising: a plurality of optically switchable elements, each optically switchable element comprising a portion of phase change material defining a pixel of the apparatus, each pixel of phase change material being thermally switchable between a plurality of stable states having different refractive indices relative to each other; and a plurality of switching elements, each switching element being configured selectively to cause heating in a corresponding one of the pixels of phase change material to perform thermal switching of the pixel of phase change material, wherein: each pixel of phase change material has a length to width aspect ratio of at least 20:1.

It is known to use phase change material (PCM) in optoelectronic devices such as high resolution reflective displays, see-through displays, and force sensors. PCMs are materials that can be switched by electrical, optical or thermal means between a plurality of phases having different optoelectronic properties. Bi-stable PCMs are particularly attractive because after a phase transition has been completed it is not necessary to continuously apply power to maintain the new state. PCM optoelectronic devices can dynamically change their optical properties by initiating phase transitions in the PCMs using rapid pulses of thermal energy (supplied by any means, for example by electrical or optical means). Pixels can be switched across micron scale areas to achieve high resolution display properties. However the small size of the pixel structure of a typical display device is unsuitable for application in dynamic window, mirror or low information display applications because of the complexity of the display architecture and associated control electronics which would be unacceptably expensive.

The inventors have recognised, however, that by forming the pixels of a PCM-based display as long, thin bar elements (having an aspect ratio of 20:1 or more), control circuitry can be simplified and heat input and output to individual pixels improved. When implemented in this way, PCM-based displays become practical for use over large areas and/or in low cost/low power consumption scenarios.

In an embodiment, a change in transmittance through the optical apparatus due to switching of the PCM pixel is larger for infrared energy than for visible light energy. In this way, it is possible to control the amount of heat input through the optical apparatus without excessively changing the visual properties perceived by a user. Thus, for example, a glazing unit may be provided which reduces the extent to which a room is heated by sunlight without causing the room to become undesirably dim. This approach is particularly effective because the IR radiation blocked by the window is reflected rather than absorbed. Additionally, the mechanism may be used in the opposite sense, to reflect long-wavelength IR back into the room on cold days to reduce heat leakage.

The optical apparatus may form part of a glazing unit, such as a window for a building or a window or sunroof for a car. Alternatively or additionally, the optical apparatus may be partially or fully reflective (or selectively reflective), such as may be useful when used in a mirror (e.g. rear view mirror of a car) or in signage (e.g. route signage such as road signs or path signs, or warning/information signs) or in other low information displays such as watches.

The invention will now be further described, by way of example, with reference to the accompanying drawings, in which.

Throughout this specification, the terms "optical" and "light" are used, because they are the usual terms in the art relating to electromagnetic radiation, but it is understood that in the context of the present specification they are not limited to visible light. It is envisaged that the invention can also be used with wavelengths outside of the visible spectrum, such as with infrared and ultraviolet light.

Figure 1:
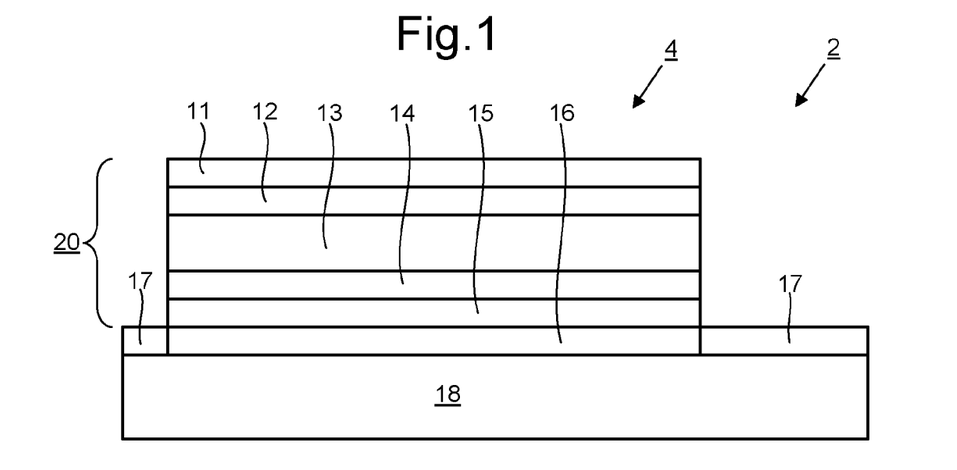
FIG. 1 is a schematic end sectional view of a single optically switchable element in an optical apparatus of an embodiment.

FIG. 1 depicts a portion of an optical apparatus 2 according to an embodiment. The apparatus 2 comprises a plurality of optically switchable elements 4 supported by a support substrate 18. The portion of the apparatus 2 shown in FIG. 1 contains only one of the optically switchable elements 4.

The support substrate 18 may take various forms. The support substrate 18 may comprise one or more of the following for example: a semiconductor wafer, $SiO_2$, or a flexible substrate such as a polymer film. In an embodiment, as depicted in FIG. 1 for example, the support substrate 18 may further comprise electrical connections 17 (e.g. conductive tracks) for powering switching elements 16 (described below).

The optically switchable element 4 comprises a stack 20 of layers. The stack 20 comprises a portion of phase change material (PCM) defining a pixel 12 of the apparatus (which may be referred to as a pixel of phase change material or simply as a PCM pixel) 12. Each PCM pixel may consist of a separate layer of PCM or a designated portion of a layer of PCM that is shared between a plurality of PCM pixels 12. In an embodiment, each PCM pixel 12 is thermally switchable at least predominantly independently of the PCM pixel 12 of at least one other of the optically switchable elements 4 (there may be some cross-talk between neighbouring PCM pixels 12, where heating intended for one PCM pixel 12 also causes a degree of heating in a neighbouring PCM pixel 12). In an embodiment, each PCM pixel 12 is switchable independently of each and every other PCM pixel 12. Each PCM pixel 12 is switchable between a plurality of stable states having different refractive indices relative to each other. In an embodiment, the switching is reversible. Each stable state has a different refractive index (optionally including a different imaginary component of the refractive index, and thereby a different absorbance) relative to each of the other stable states. In an embodiment all layers in each stack 20 are solid-state and configured so that their thicknesses as well as refractive index and absorption properties combine so that the different states of the PCM pixel 12 result in different, visibly and/or measurably distinct, reflection spectra. Optical devices of this type are described in Nature 511, 206-211 (10 Jul. 2014), WO2015/097468A1, WO2015/097469A1, EP16000280.4 and PCT/GB2016/053196.

In an embodiment the PCM pixel comprises, consists essentially of, or consists of, one or more of the following: an oxide of vanadium (which may also be referred to as VOx); an oxide of niobium (which may also be referred to as NbOx); an alloy or compound comprising Ge, Sb, and Te; an alloy or compound comprising Ge and Te; an alloy or compound comprising Ge and Sb; an alloy or compound comprising Ga and Sb; an alloy or compound comprising Ag, In, Sb, and Te; an alloy or compound comprising In and Sb; an alloy or compound comprising In, Sb, and Te; an alloy or compound comprising In and Se; an alloy or compound comprising Sb and Te; an alloy or compound comprising Te, Ge, Sb, and S; an alloy or compound comprising Ag, Sb, and Se; an alloy or compound comprising Sb and Se; an alloy or compound comprising Ge, Sb, Mn, and Sn; an alloy or compound comprising Ag, Sb, and Te; an alloy or compound comprising Au, Sb, and Te; and an alloy or compound comprising Al and Sb (including the following compounds/alloys in any stable stoichiometry: GeSbTe, VOx, NbOx, GeTe, GeSb, GaSb, AgInSbTe, InSb, InSbTe, InSe, SbTe, TeGeSbS, AgSbSe, SbSe, GeSbMnSn, AgSbTe, AuSbTe, and AlSb). Preferably, the PCM comprises one of $Ge_2Sb_2Te_5$ and $Ag_3In_4Sb_{76}Te_{17}$. It is also understood that various stoichiometric forms of these materials are possible: for example $Ge_xSb_yTe_z$; and another suitable material is $Ag_3In_4Sb_{76}Te_{17}$ (also known as AIST). Furthermore, any of the above materials can comprise one or more dopants, such as C or N. Other materials may be used.

PCMs are known that undergo a drastic change in both the real and imaginary refractive index when switched between amorphous and crystalline phases. The switching can be achieved for example by heating induced by suitable electric pulses or by a light pulse from a laser light source, or, as in embodiments described below, by thermal conduction of heat generated by a switching element in thermal contact with the PCM. There is a substantial change in the refractive index when the material is switched between amorphous and crystalline phases. The material is stable in either state.

Switching can be performed an effectively limitless number of times. However, it is not essential that the switching is reversible.

Although some embodiments described herein mention that the material layer is switchable between two states such as crystalline and amorphous phases, the transformation could be between any two solid phases, including, but not limited to: crystalline to another crystalline or quasi-crystalline phase or vice-versa; amorphous to crystalline or quasi-crystalline/semi-ordered or vice versa, and all forms in between. Embodiments are also not limited to just two states.

In an embodiment, the PCM pixel 12 comprises $Ge_2Sb_2Te_5$ (GST) in a layer less than 200 nm thick. In another embodiment, the PCM pixel 12 comprises GeTe (not necessarily in an alloy of equal proportions) in a layer less than 100 nm thick.

Figure 7:
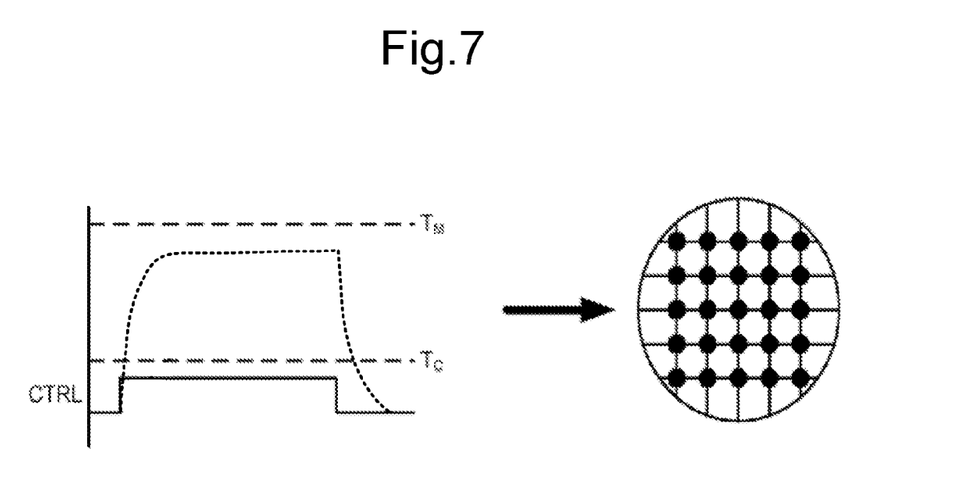
FIG. 7 depicts a heater control cycle (left) for switching an example PCM pixel into a crystalline state (depicted schematically on the right)
Figure 8:
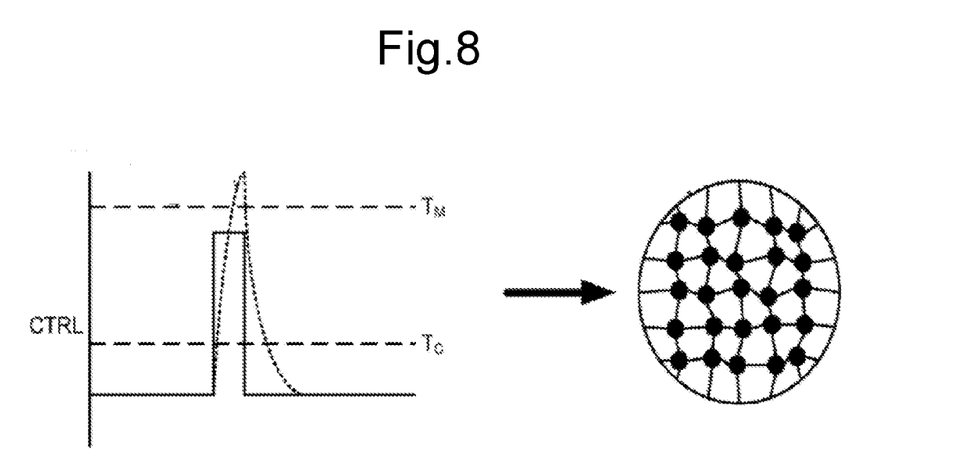
FIG. 8 depicts a heater control cycle (left) for switching an example PCM pixel into an amorphous state (depicted schematically on the right)

A plurality of switching elements 16 are provided for selectively actuating each of the PCM pixels 12 as desired. Each switching element 16 selectively heats a corresponding one of the PCM pixels 12 to perform the thermal switching. Examples of thermal heating profiles (temperature against time) suitable for example switches (amorphous to crystalline and crystalline to amorphous) are shown in FIGS. 7 and 8 and described in further detail below.

In the particular example of FIG. 1, the stack 20 comprises a reflective layer 14. When the apparatus 2 is configured to operate as a mirror or low information display, the reflective layer 14 may be made highly reflective. In other applications, the reflective layer 14 may be only partially reflective or the reflective layer 14 may be omitted entirely. In an embodiment, the reflective layer 14 comprises reflective material such as a metal. Metals are known to provide good reflectivity (when sufficiently thick) and also have high thermal and electrical conductivities. The reflective layer 14 may have a reflectance of 50% or more, optionally 90% or more, optionally 99% or more, with respect to visible light, infrared light, and/or ultraviolet light. The reflective layer 14 may comprise a thin metal film, composed for example of Au, Ag, Al, or Pt. If this layer is to be partially reflective then a thickness in the range of 5 to 15 nm might be selected, otherwise the layer is made thicker, such as 100 nm, to be substantially totally reflective.

In the embodiment of FIG. 1 the stack 20 further comprises a spacer layer 13. The spacer layer 13 is between the PCM pixel 12 and the reflective layer 14.

In the embodiment of FIG. 1 the stack 20 further comprises a capping layer 11. The PCM pixel 12 is between the capping layer 11 and the support substrate 18. In this particular embodiment, the upper surface of the capping layer 11 constitutes the viewing surface of the apparatus 2, and the reflective layer 14 acts as a back-reflector when required as a mirror. Light enters and leaves through the viewing surface (from above in FIG. 1). However, because of interference effects which are dependent on the refractive index of the PCM in the PCM pixel 12 and the thickness of the spacer layer 13, the reflectivity varies significantly as a function of wavelength. The spacer layer 13 and the capping layer 11 are both optically transmissive, and are ideally as transparent as possible.

Each of the capping layer 11 and spacer layer 13 may consist of a single layer or comprise multiple layers having different refractive indices relative to each other (i.e. where the capping layer 11 or spacer layer 13 consists of multiple layers at least two of those layers have different refractive indices relative to each other). The thickness and refractive index of the material or materials forming the capping layer 11 and/or spacer layer 11 are chosen to create a desired spectral response (via interference and/or absorption). Materials which may be used to form the capping layer 11 and/or spacer layer 13 may include (but are not limited to) ZnO, $TiO_2$, $SiO_2$, $Si_3N_4$, TaO and ITO.

In an embodiment, the switching element 16 comprises a resistive heating element. The switching element 16 may for example comprise a metal or metal alloy material that exhibits suitable resistivity and high thermal conductivity. For example, the switching element 16 can be formed from titanium nitride (TiN), tantalum nitride (TaN), nickel chromium silicon (NiCrSi), nickel chromium (NiCr), tungsten (W), titanium tungsten (TiW), platinum (Pt), tantalum (Ta), molybdenum (Mo), niobium (Nb), or iridium (Ir), or any of a variety of or a combination of similar metal or metal alloys that have the above properties and have a melting temperature that is higher than the melting temperature of the PCM in the PCM pixel 12. In other embodiments the switching element 16 may comprise a non-metallic or metal oxide (e.g. ITO) material.

In the embodiment of FIG. 1 the stack 20 further comprises a barrier layer 15 between the switching element 16 and the rest of the layers of the stack 20. In an embodiment, the barrier layer 15 is an electrical insulator that is thermally conductive such that the barrier layer 15 electrically insulates the switching element 16 from the PCM pixel 12, but allows heat from the switching element 16 to pass through the barrier layer 15 to the PCM pixel 12 to change the state of the PCM pixel 12, for example to a crystallized state in response to a first heating profile and to an amorphous state in response to a second heating profile. In example embodiments the barrier layer 15 comprises one or more of the following: SiN, AlN, $SiO_2$, silicon carbide (SiC), and diamond (C).

Any or all of the layers in each stack 20 may be formed by sputtering, which can be performed at a relatively low temperature of 100 degrees C. The layers can also be patterned using conventional techniques known from lithography, or other techniques e.g. from printing. Additional layers may also be provided for the device as necessary.

In a particular embodiment, the PCM pixel 12 comprises GST, is less than 100 nm thick, and preferably less than 10 nm thick, such as 6 or 7 nm thick. The spacer layer 13 is grown to have a thickness typically in the range from 10 nm to 250 nm, depending on the colour and optical properties required, as discussed below. The capping layer 11 is, for example, 20 nm thick.

Figure 2:
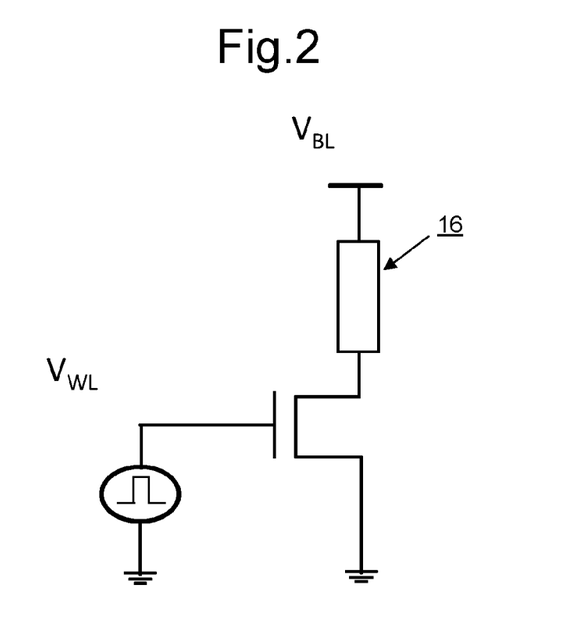
FIG. 2 is an example circuit for driving the optically switchable element of FIG. 1.

In an embodiment, each optically switchable element 4 is compatible with standard microelectronic device switches such as a conventional Field Effect Transistor (FET) or, alternatively, a Thin Film Transistor (TFT). These switches may be referred to as selector elements. An exemplary switching circuit is illustrated in FIG. 2. The appropriate pulse (e.g. nano- to microsecond or longer) is applied as a voltage $V_{WL}$ from the word-line to the gate of the FET in FIG. 2. This causes a current flow along the bit line from $V_{BL}$ and through the switching element 16 (e.g. resistive heating element). Joule heating in the switching element 16 causes switching of the PCM pixel 12. Switching between amorphous and crystalline states can be achieved by varying the size and width of the pulse as described below. It will be appreciated that this is a typical configuration and other arrangements are known in the art which are also compatible with switching PCM based pixels.

Figure 3:
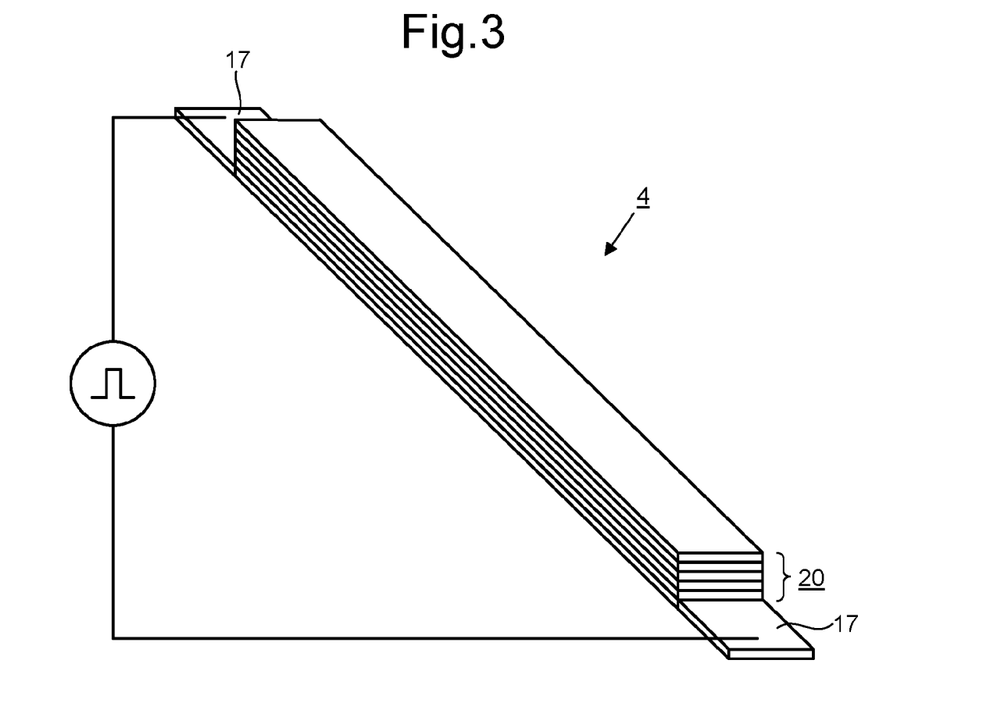
FIG. 3 is a schematic perspective view showing electrical connections to an optically switchable element of the type depicted in FIG. 1.

In contrast to pixels of a standard display, each PCM pixel 12 of embodiments disclosed herein have a length to width aspect ratio of at least 20:1 when viewed along a viewing direction of the optical apparatus 2 (e.g. perpendicular to a plane of a portion of the support substrate 18 immediately below the PCM pixel 12), optionally greater than 50:1, optionally greater than 100:1, optionally greater than 200:1, optionally greater than 500:1. This elongate form is depicted schematically in the perspective view of an optically switchable element 4 of FIG. 3. In one particular example, each PCM pixel 12 has a width of 2 microns and a length of 1250 microns.

Figure 4:
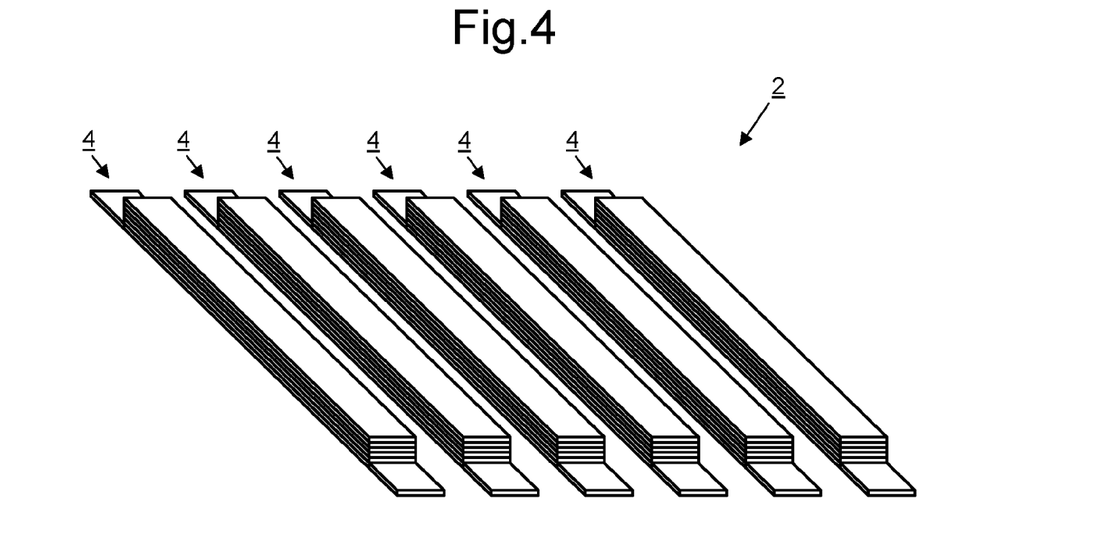
FIG. 4 is a schematic perspective view of a set of optically switchable elements in which PCM pixels are aligned in a direction parallel to the width of each PCM pixel.
Figure 10:
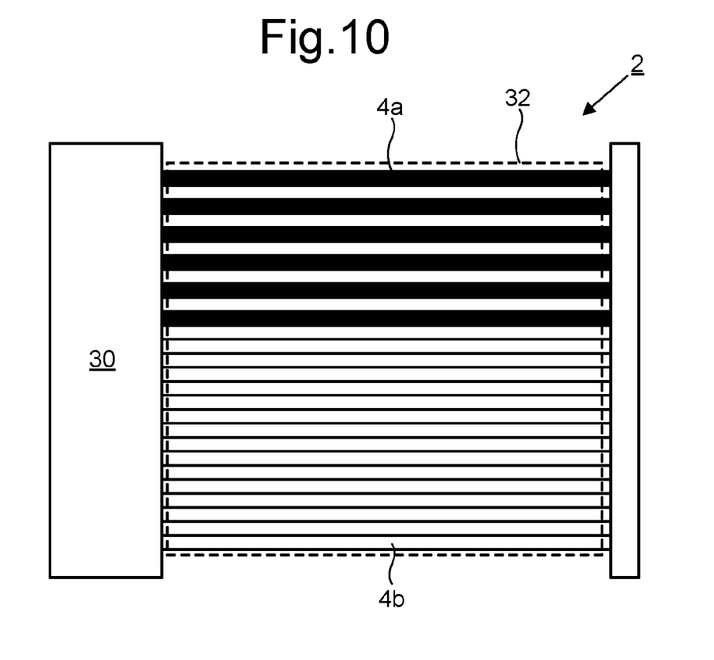
FIG. 10 depicts a car sunroof comprising an optical apparatus having PCM pixels spanning across the whole of a viewing area.

Providing elongate PCM pixels 12 allows the PCM pixels 12 to be addressed efficiently, thereby reducing the cost of driving electronics significantly. Firstly, a relatively large area can be addressed using a single selector, whereas the same addressing could only be achieved in a system comprising non-elongate pixels by sending separate signals to many selector elements distributed along a line corresponding to the elongation of the elongate PCM pixel 12. Secondly, the elongate geometry facilitates positioning of selector elements entirely outside of a viewing area, for example along an edge of the viewing area, or at least in more localized regions in the viewing area, for example along lines corresponding with edges of sets of parallel elongate PCM pixels 12. A particularly efficient arrangement is where the PCM pixels are aligned in linear arrays, e.g. when a set of the PCM pixels 12 are provided that are aligned in a direction parallel to the width of each PCM pixel 12. This is depicted schematically in FIG. 4 for an exemplary six optically switchable elements 4. In practice such arrays will have many more than six optically switchable elements 4, for example 100s or 1000 s, thereby providing large area coverage, e.g. on $cm^2$ scale, without expensive driving electronics. In such embodiments the PCM pixels 12 may be sufficiently elongate that they span a large proportion of a dimension of a viewing area of the apparatus 2 in a direction parallel to the length of the PCM pixels 12. In an embodiment, each PCM pixel 12 in the set spans at least 20% of an average dimension of the viewing area 32 (see FIG. 10) of the apparatus 2 in the direction parallel to the length of each PCM pixel 12, optionally at least 50%. The viewing area 32 may comprise all of the region through which it is possible to see in the case of a transmissive apparatus 2, or all of the region that is reflective in the case of a reflective apparatus 2. An example viewing area 32 is depicted in FIG. 10. In the case where a viewing area 32 is rectangular or square, the average dimension of the viewing area 32 may comprise a length or width of the rectangle or square. Each of the PCM pixels 12 in the set of aligned PCM pixels 12 may also be parallel with one of the edges of the rectangle or square (as in FIG. 10). In an embodiment, one or more of the PCM pixels 12 in the set spans completely across the viewing region (as in FIG. 10). In an embodiment, the set of PCM pixels 12, and any spaces between the PCM pixels 12 in the direction parallel to the width of the PCM pixels 12 covers at least 50% of the surface area of the viewing region, optionally at least 90% of the surface area of the viewing region, optionally all of viewing region.

Figure 5:
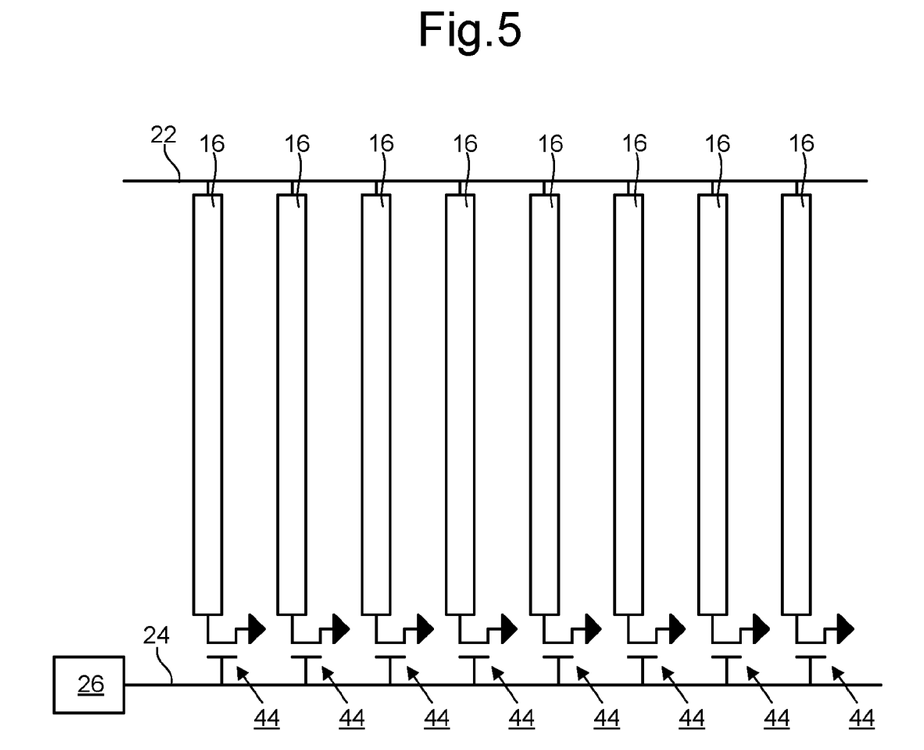
FIG. 5 depicts example TFT driver circuitry for switching a set of optically switchable elements of the type depicted in FIG. 4.

FIG. 5 depicts an array of optically switchable elements 4 (each comprising one elongate PCM pixel 12) and associated TFT driving circuitry (implementing a selector element for each elongate PCM pixel 12). Each selector element comprises an electronic unit 44 (in this case a TFT but other configurations could be used) that provides a current to a corresponding one of the switching elements 16 when the selected element is addressed by a control signal 24. The skilled person would understand that selector elements could be configured in other ways. Each switching element 16 is connected to a common power supply line 22. Individual TFTs (as previously illustrated for a single element in FIG. 2) are connected between each switching element 16 and a common ground. In this simple example a pulse generator unit 26 supplies pulses of the appropriate shape and timing to the TFT gates as the control signal 24 (via a bus), thereby switching all optically switchable elements 4 corresponding to the switching elements 16 to either an amorphous or crystalline state as required. More complex custom TFT driving arrangements are possible in which selected individual ones or groups of switching elements 16 (and corresponding optically switchable elements) are controlled individually, thereby creating banded structures or graded optical profiles across the optical apparatus (e.g. window) as required. The elongate form of the PCM pixels 12 is convenient because it allows multiple optically switchable elements 4 to be easily switched as a group (as shown in FIG. 5), as well as facilitating convenient geometrical placement of control electronics and connections (e.g. only along the edges corresponding to the ends of the elongate PCM pixels 12). In the case where the PCM pixels 12 span completely across the viewing area 32, all of the electrical connections and control electronics for the corresponding switching elements 16 can be positioned outside of the viewing area 32, meaning that they no longer have to be made transparent. Manufacturing costs can therefore be decreased.

Figure 11:
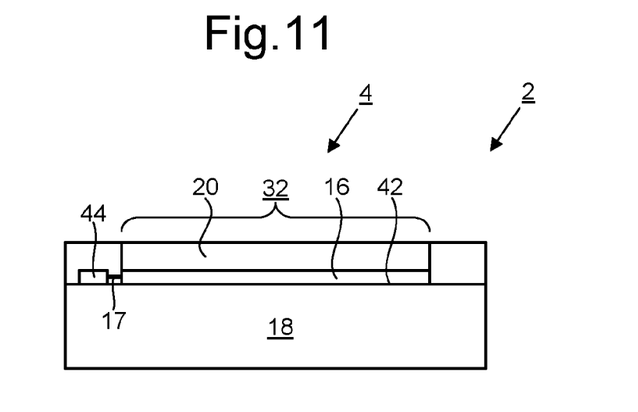
FIGS. 11-13 depict alternative positioning options for a selector element that is not provided on a front face of a support substrate within a viewing area.
Figure 12:
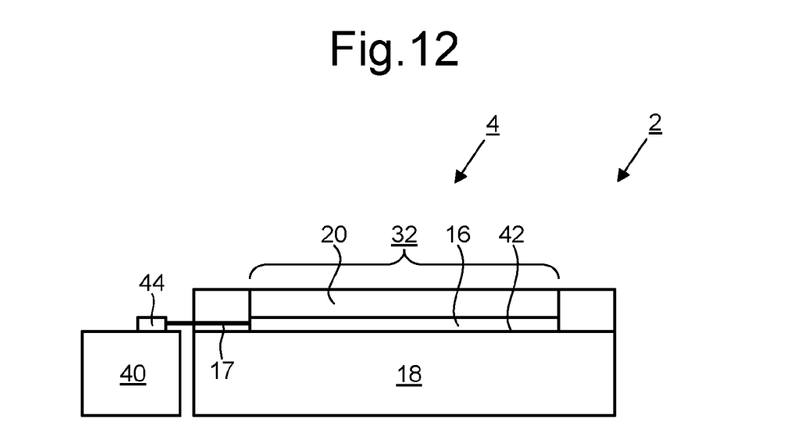
Figure 13:
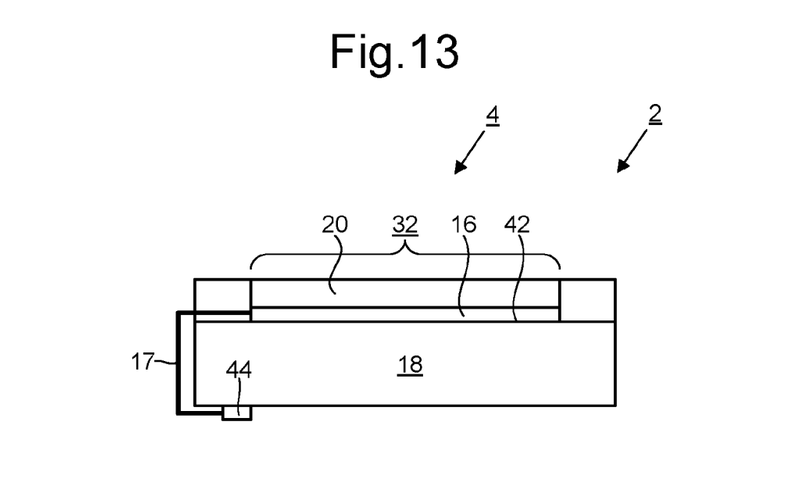

FIGS. 11-13 schematically depict different possible placements of the electronic unit 44 (e.g. FET or TFT) of a selector element, each placement being facilitated by the elongate pixel geometry. In the example of FIG. 11, the electronic unit 44 of at least one selector element is positioned on the support substrate 18 (with or without intervening layers but in front of a front face 42 of the support substrate 18) outside of a viewing area 32. In other embodiments, an example of which is schematically depicted in FIG. 12, the electronic unit 44 of at least one selector element is positioned on a further support substrate 40 that is non-integral with the support substrate 18. In other embodiments, an example of which is depicted in FIG. 13, the electronic unit 44 of at least one selector element is positioned on the support substrate 18 (with or without intervening layers) on a surface other than the front face 42 of the support substrate 18, for example on a peripheral side of the support substrate 18 or on a rear face of the support substrate 18, opposite to the front face 42, as is the case in the example of FIG. 13. Avoiding or reducing the need to position electronic units 44 within the viewing area 32, or even on the same support substrate as the optically switchable elements 4, reduces cost and/or provides advantageous manufacturing flexibility and/or improved display performance.

Furthermore, the elongate form of the PCM pixels 12 facilitates efficient thermal switching of the PCM pixels 12. Firstly, the large ratio of perimeter length to surface area ratio for each PCM pixel 12 facilitates removal of heat from each PCM pixel 12 by providing a greater surface area over which heat can escape from the PCM pixel 12 laterally. This facilitates rapid switching of the PCM pixels 12 and helps to prevent overheating of the pixel elements 12. Secondly, the elongate form facilitates uniform heating because resistive heating elements of the appropriate resistance can be formed that follow more naturally the geometry of each PCM pixel 12 (e.g. comprising one or more linear members aligned parallel to the axis of elongation of the PCM pixel 12) than will typically be possible for less elongate pixels (where the resistive heating element may need to comprise a more complex sinuous conductive track, particularly for larger pixels).

In an embodiment, each PCM pixel 12 comprises a region of phase change material that is non-integral with the phase change material of any other PCM pixel 12. This facilitates independent actuation of different pixels and reduces crosstalk between pixels (e.g. when heat used to switch one pixel causes some heating of one or more neighbouring pixels). Alternatively, each PCM pixel 12 comprises a different portion of a continuous phase change material member that is shared between the PCM pixels 12. In this case, the reflective layer 14 may be patterned so that the portion of the reflective layer 14 beneath each PCM pixel 12 is at least partially isolated from the portion of the reflective layer 14 beneath directly adjacent (nearest neighbour) PCM pixels 12. This may be achieved by each portion of the reflective layer 14 being at least partially non-integral with other portions, for example at least partially separated from the other portions by material of lower thermal conductivity.

Figure 6:
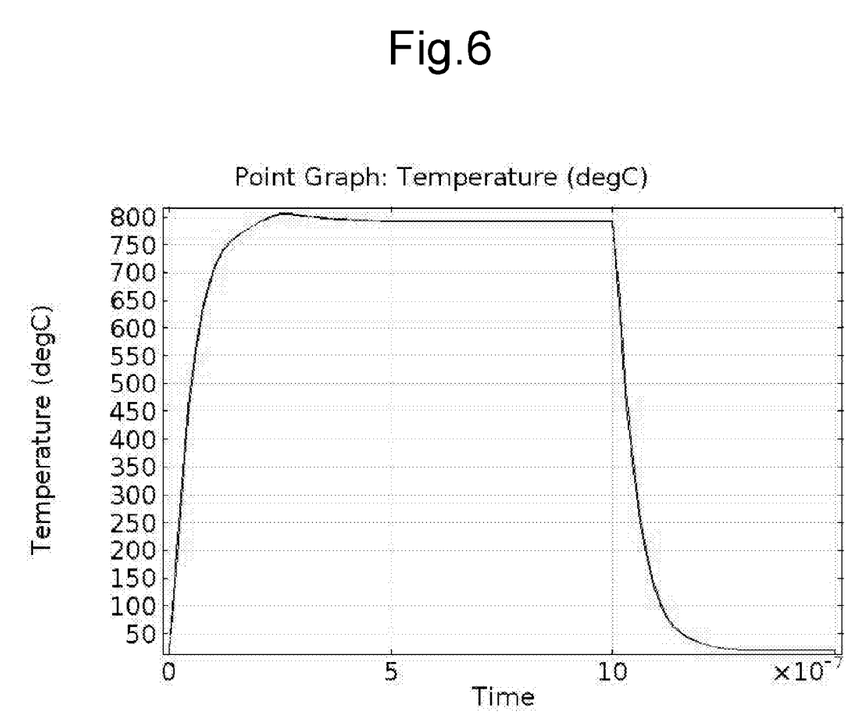
FIG. 6 depicts results of finite element thermal modelling showing a temperature profile of a PCM pixel being subjected to a thermal pulse.

FIG. 6 depicts the results of finite element thermal modelling of a PCM pixel 12 during a period in which a pulse of heating is applied by a switching element 16. The finite element thermal modelling was implemented using the COMSOL multi-physics package based on parameters of an embodiment. The switching element 16 comprised a resistive heating element capable of delivering a fast nanosecond pulse to the PCM material without delivering too much heat to adjacent areas which could cause parasitic switching. The heating element was 2×1250 microns and was subjected to a 1 microsecond current pulse. FIG. 6 shows that the resulting temperature profile of the PCM pixel 12 comprises a temporally well defined (sharp) pulse suitable for effective amorphisation of the PCM in the PCM pixel 12.

Example details of PCM pixel 12 switching are illustrated in FIGS. 7 and 8. Here, a switching element 16 comprising a resistive heating element is driven by a control signal CTRL. The control signal CTRL in this example comprises a current pulse of one of two predefined types, each different type of pulse being suitable for generating a variation of temperature with time (a heating profile) that is suitable for a different type of switching.

In FIG. 7 the control signal CTRL (solid line) comprises a pulse of relatively low amplitude and long duration. The pulse provides a first heating profile (dotted line) effective for switching the PCM pixel 12 to a crystalline state (shown on the right). The first heating profile is such that the PCM pixel 12 is heated to a temperature higher than the crystallization temperature $T_C$ of the PCM, but less than the melting temperature $T_M$ of the PCM. The temperature is maintained above the crystallization temperature $T_C$ for a time sufficient to crystallize the PCM.

In FIG. 8 the control signal CTRL (solid line) comprises a pulse of higher amplitude but shorter duration. The pulse provides a second heating profile (dotted line) effective for switching the PCM pixel 12 to an amorphous state (shown on the right). The second heating profile is such that the PCM pixel 12 is heated to a temperature that is higher than the melting temperature $T_M$, causing melting of the PCM, but is cooled sufficiently quickly that re-crystallization does not occur excessively and the PCM freezes into an amorphous state. It is important for this process that the resistive heating element is in good thermal contact with the PCM pixel 12 and that heat can escape sufficiently quickly from the PCM pixel 12 to achieve the rapid cooling necessary to prevent re-crystallization. The properties of the barrier layer 15, including for example composition and thickness, can be selected to achieve the properties required.

As demonstrated in the example of FIGS. 7 and 8, after the heating of the PCM pixel 12 has finished the PCM remains in the stable state selected (e.g. amorphous or crystalline) until further heating is applied. Thus, the optically switchable element 4 is naturally held in a given optical state without application of any signal, and can thus operate with significantly less power than typical display technologies. Switching can be performed an effectively limitless number of times. The switching speed is also very rapid, typically less than 300 ns, and certainly several orders faster than the human eye can perceive.

Furthermore PCM pixels switched in this way can be of a relatively large dimension, for example 2×1250 microns or even larger, as required for the dynamic window, mirror or signage application.

In various embodiments, the transmittance through the apparatus 2 at each of the optically switchable elements 4 is at least 50%, optionally at least 80%, optionally at least 90%, optionally at least 95%, optionally at least 99%, for at least one of the stable states of the PCM pixel 12. Thus, the apparatus 2 may be configured to work in a transmissive mode rather than in a purely reflective mode. Such a mode may be applicable for example where the apparatus 2 is implemented as part of a glazing unit, for example for a building or vehicle.

Figure 9:
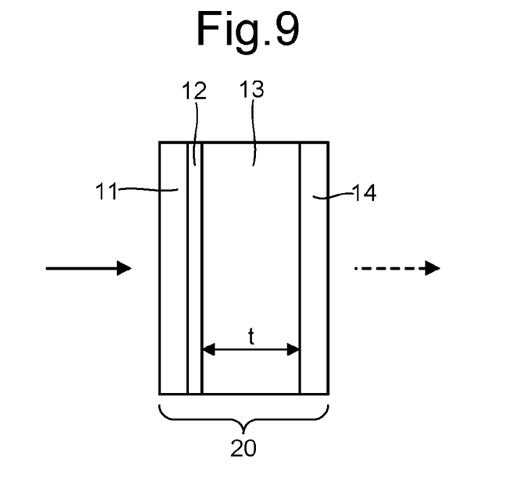
FIG. 9 is a schematic side view of a transmissive pixel.

FIG. 9 depicts an example configuration for a stack 20 in a transmissive optical apparatus 2. The optical apparatus 2 may be implemented as a glazing unit (which may be referred to as smart glazing) for example. The glazing unit may be configured dynamically to control transmission of infra-red radiation through the glazing unit.

The stack 20 of this embodiment comprises a PCM pixel 12 comprising a layer of PCM less than 100 nm thick and typically 5 to 15 nm thick. In this specific embodiment the PCM comprises $Ge_2Sb_2Te_2$ (GST).

The stack 20 comprises a reflective layer 14, which in this case is partially reflective (e.g. formed from a thin layer of Ag). The stack 20 further comprises a spacer layer 13 sandwiched between the PCM pixel 12 and the reflective layer 14. An optional capping layer 11 is provided on the front side of the device. The spacer layer 13 and the capping layer 11 comprise an optically transmissive material such as ITO. Any of the compositions disclosed above for the PCM pixel 12 and for any of the other layers may be used.

Light incident from the left (as indicated by solid line arrow) is at least partially transmitted through the stack 20 (as indicated by broken line arrow). However absorption and interference effects altered by the thickness t of the spacer layer 13 alters the spectrum of transmitted light. The spectrum can be altered both in the visible range and in other ranges. For example, a large change in transmittance in the infrared part of the spectrum can be achieved between the amorphous and crystalline states of the PCM such that the change in total infrared energy transmitted through the device can be switched by more than 25%. Thus solar infrared light energy can be transmitted through the apparatus 2 to provide heating for the interior of a building, for example, or the device can be switched to reflect more infrared to reduce unwanted heating of the interior of the building.

By appropriate choice of materials and layer thicknesses, the apparatus 2 can provide a large change across the infrared part of the spectrum, whilst only affecting the visible light to a much smaller degree. Thus, the apparatus 2 can be configured such that a change in transmittance through the optically switchable element 4 due to switching of the PCM pixel 12 is larger for infrared energy than for visible light energy. Optionally, the change in transmittance is at least 10% larger for infrared energy than for visible light energy. In one particular example, the total energy transmitted at the visible wavelengths may be affected by less than 20% while the amount of infrared energy is changed significantly more. In this way, the brightness of visible light admitted into the building through the apparatus 2 can be maintained, while still unobtrusively regulating the heat energy (infrared) transmitted. In other words, the visible appearance does not necessarily change or appear tinted even when changing the infrared transmission. A specific example of a stack 20 for this application comprises 10 nm of ITO as a capping layer 11, a 10 nm thick layer of GST as the PCM pixel 12, a 95 nm thick layer of ITO as a spacer layer 13 and a 15 nm thick silver layer as the partially-reflective layer 14. A resistive heating element of the switching element 16 (not shown in FIG. 9) would typically be optically transmissive and not contribute significantly to any wavelength dependent optical effects.

FIG. 10 depicts an example configuration that is particularly suitable for an automotive application in which a portion of a roof window is switched between a darkened state and a transmissive state. In this case TFT driver circuitry 30 has actuated the darkened window band (containing the darker optically switchable elements 4a) into an amorphous state with reduced optical transmission, while the rest of the window (containing the lighter optically switchable elements 4a) remains untinted. The arrangement of FIG. 10 is an example of an embodiment in which each PCM pixel 12 spans more than 50% of the average dimension of the viewing area 32 of the apparatus 2 in a direction parallel to the length of each PCM pixel 12 (in this case spanning substantially across all of the viewing area 32). The arrangement of FIG. 10 allows direct glare from the sun to be mitigated while allowing in indirect sunlight from the sky to illuminate the interior of the car. With more complex TFT driver circuitry the position of the band could also be controlled electronically so that the window shade can be positioned as required. Alternatively or additionally, grey scale bands could be implemented and positioned on a car windscreen to mitigate the effect of a bright sky or reflective road surface ahead.

The invention claimed is:

1. An optical apparatus, comprising:
a plurality of optically switchable elements, each optically switchable element comprising a portion of phase change material defining a pixel of the apparatus, each pixel of phase change material being individually addressable to thermally switch between a plurality of stable states having different refractive indices relative to each other; and
a plurality of switching elements, each switching element corresponding to a different one of the pixels of phase change material and configured selectively to cause heating in a corresponding one of the pixels of phase change material to perform selective thermal switching of the pixel of phase change material independently of other pixels in the apparatus,
wherein each pixel of phase change material has a length to width aspect ratio of at least 20:1, and
wherein a change in transmittance through each of one or more of the optically switchable elements due to switching of the pixel of phase change material is larger for infrared energy than for visible light energy.

2. The apparatus of claim 1, wherein a set of the pixels of phase change material are aligned in a direction parallel to the width of each pixel of phase change material and each pixel of phase change material spans at least 20% of an average dimension of a viewing area of the apparatus in a direction parallel to the length of each pixel of phase change material.

3. The apparatus of claim 2, wherein each pixel of phase change material in the set spans more than 50% of the average dimension of the viewing area of the apparatus in a direction parallel to the length of each pixel of phase change material.

4. The apparatus of claim 2, wherein each pixel of phase change material in the set spans completely across the viewing area.

5. The apparatus claim 1, wherein each pixel of phase change material is non-integral with each other pixel of phase change material.

6. The apparatus of claim 1, wherein the transmittance through the apparatus at each of one or more of the optically switchable elements is at least 50% for at least one of the stable states of the pixel of phase change material.

7. The apparatus of claim 1, wherein the change in transmittance is at least 10% larger for infrared energy than for visible light energy.

8. The apparatus of claim 1, further comprising:
a first support substrate supporting the plurality of pixels of phase change material on a front face of the first support substrate; and
a plurality of selector elements, each selector element comprising an electronic unit configured to provide a current to a corresponding one of the switching elements when the selector element is addressed by a control signal, wherein:
the electronic unit of each selector element is positioned on the first support substrate outside of a viewing area of the apparatus, on the first support substrate on a surface other than the front face of the first support substrate, or on a second support substrate that is non-integral with the first support substrate.

9. The apparatus of claim 1, wherein the pixel of phase change material comprises one or more of the following:
an oxide of vanadium; an oxide of niobium;
an alloy or compound comprising Ge, Sb, and Te;
an alloy or compound comprising Ge and Te;
an alloy or compound comprising Ge and Sb;
an alloy or compound comprising Ga and Sb;
an alloy or compound comprising Ag, In, Sb, and Te;
an alloy or compound comprising In and Sb;
an alloy or compound comprising In, Sb, and Te;
an alloy or compound comprising In and Se;
an alloy or compound comprising Sb and Te;
an alloy or compound comprising Te, Ge, Sb, and S;
an alloy or compound comprising Ag, Sb, and Se;
an alloy or compound comprising Sb and Se;
an alloy or compound comprising Ge, Sb, Mn, and Sn;
an alloy or compound comprising Ag, Sb, and Te;
an alloy or compound comprising Au, Sb, and Te; and
an alloy or compound comprising Al and Sb.

10. The apparatus of claim 1, wherein each optically switchable element comprises a stack of layers comprising a spacer layer provided between the pixel of phase change material and a support substrate, wherein the spacer layer consists of a single layer or comprises multiple layers of materials having different refractive indices.

11. The apparatus of claim 10, wherein each stack of layers further comprises a reflective layer, wherein the spacer layer is provided between the pixel of phase change material and the reflective layer.

12. The apparatus of claim 1, wherein each optically switchable element comprises a stack of layers comprising a capping layer, wherein the pixel of phase change material is provided between the capping layer and a support substrate and the capping layer consists of a single layer or comprises multiple layers of materials having different refractive indices.

13. A glazing unit comprising the apparatus of claim 1.

14. A rear view mirror comprising the apparatus of claim 1.

15. A low information display comprising the apparatus of claim 1.

16. An optical apparatus, comprising:
a plurality of optically switchable elements, each optically switchable element comprising a portion of phase change material defining a pixel of the apparatus, each pixel of phase change material being individually addressable to thermally switch between a plurality of stable states having different refractive indices relative to each other;
a plurality of switching elements, each switching element corresponding to a different one of the pixels of phase change material and configured selectively to cause heating in a corresponding one of the pixels of phase change material to perform selective thermal switching of the pixel of phase change material independently of other pixels in the apparatus, wherein each pixel of phase change material has a length to width aspect ratio of at least 20:1;
a first support substrate supporting the plurality of pixels of phase change material on a front face of the first support substrate; and
a plurality of selector elements, each selector element comprising an electronic unit configured to provide a current to a corresponding one of the switching elements when the selector element is addressed by a control signal, wherein:
the electronic unit of each selector element is positioned on the first support substrate outside of a viewing area of the apparatus, on the first support substrate on a surface other than the front face of the first support substrate, or on a second support substrate that is non-integral with the first support substrate.

17. An optical apparatus, comprising:
a plurality of optically switchable elements, each optically switchable element comprising a portion of phase change material defining a pixel of the apparatus, each pixel of phase change material being individually addressable to thermally switch between a plurality of stable states having different refractive indices relative to each other; and
a plurality of switching elements, each switching element corresponding to a different one of the pixels of phase change material and configured selectively to cause heating in a corresponding one of the pixels of phase change material to perform selective thermal switching of the pixel of phase change material independently of other pixels in the apparatus,
wherein each pixel of phase change material has a length to width aspect ratio of at least 20:1, and
wherein each optically switchable element comprises a stack of layers comprising a spacer layer provided between the pixel of phase change material and a support substrate, wherein the spacer layer consists of a single layer or comprises multiple layers of materials having different refractive indices.

18. The apparatus of claim 17, wherein each stack of layers further comprises a reflective layer, wherein the spacer layer is provided between the pixel of phase change material and the reflective layer.

19. An optical apparatus, comprising:
a plurality of optically switchable elements, each optically switchable element comprising a portion of phase change material defining a pixel of the apparatus, each pixel of phase change material being individually addressable to thermally switch between a plurality of stable states having different refractive indices relative to each other; and
a plurality of switching elements, each switching element corresponding to a different one of the pixels of phase change material and configured selectively to cause heating in a corresponding one of the pixels of phase change material to perform selective thermal switching of the pixel of phase change material independently of other pixels in the apparatus,
wherein each pixel of phase change material has a length to width aspect ratio of at least 20:1, and
wherein each optically switchable element comprises a stack of layers comprising a capping layer, wherein the pixel of phase change material is provided between the capping layer and a support substrate and the capping layer consists of a single layer or comprises multiple layers of materials having different refractive indices.

* * * * *